United States Patent
Hartrey et al.

(10) Patent No.: US 7,366,597 B2
(45) Date of Patent: Apr. 29, 2008

(54) VALIDATING CONTROL SYSTEM SOFTWARE VARIABLES

(75) Inventors: Timothy J. Hartrey, Brighton, MI (US); Mark H. Costin, Bloomfield Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 451 days.

(21) Appl. No.: 11/187,523

(22) Filed: Jul. 22, 2005

(65) Prior Publication Data

US 2007/0021882 A1   Jan. 25, 2007

(51) Int. Cl.
G01M 17/00 (2006.01)
G11C 29/12 (2006.01)

(52) U.S. Cl. .......................... 701/31; 701/35; 714/722; 702/58

(58) Field of Classification Search .................. 701/31
See application file for complete search history.

(56) References Cited

U.S. PATENT DOCUMENTS

| | | | | |
|---|---|---|---|---|
| 4,692,691 A * | 9/1987 | Sueta | ........................ | 714/736 |
| 5,631,913 A * | 5/1997 | Maeda | ........................ | 714/732 |
| 5,751,728 A * | 5/1998 | Katanosaka | .................. | 714/719 |
| 5,815,512 A * | 9/1998 | Osawa et al. | ............... | 714/726 |
| 5,946,247 A * | 8/1999 | Osawa et al. | ............... | 365/201 |
| 6,243,841 B1 * | 6/2001 | Mydill | ........................ | 714/724 |
| 6,426,912 B2 * | 7/2002 | Toda | ........................ | 365/230.03 |
| 6,480,016 B1 * | 11/2002 | Motoi et al. | ................. | 324/765 |
| 6,504,772 B2 * | 1/2003 | Maeno | ........................ | 365/201 |
| 6,510,527 B1 * | 1/2003 | Woerner et al. | ............... | 714/5 |
| 6,901,542 B2 * | 5/2005 | Bartenstein et al. | ......... | 714/719 |
| 6,950,863 B1 * | 9/2005 | Pham et al. | ................. | 709/221 |
| 7,013,414 B2 * | 3/2006 | Takeshige et al. | .......... | 714/719 |
| 7,143,314 B2 * | 11/2006 | Costin | ......................... | 714/38 |
| 7,287,204 B2 * | 10/2007 | Mayer et al. | ................ | 714/719 |
| 7,302,622 B2 * | 11/2007 | Beer | ........................ | 714/718 |
| 2001/0009523 A1 * | 7/2001 | Maeno | ........................ | 365/201 |
| 2005/0076266 A1 * | 4/2005 | Costin | ........................ | 714/38 |
| 2005/0102595 A1 * | 5/2005 | Seo | ............................ | 714/736 |
| 2006/0036911 A1 * | 2/2006 | Costin et al. | ................. | 714/25 |
| 2007/0021882 A1 * | 1/2007 | Hartrey et al. | ................ | 701/29 |

* cited by examiner

Primary Examiner—Thomas Black
Assistant Examiner—Shelley Chen

(57) ABSTRACT

A vehicle having a system for validating a variable signal for input to a processor-performed function. An input module receives the signal. A processor tests first and second storage locations of a memory. After testing, the processor stores the signal in the first and second storage locations to obtain first and second stored values. The processor compares the first and second stored values and tests the first stored value for any corruption associated with receipt of the signal by said input module. The processor inputs the first and second stored values to first and second paths for performing the function to obtain two function results, and compares the results.

23 Claims, 4 Drawing Sheets

VALIDATING CONTROL SYSTEM SOFTWARE VARIABLES

FIELD OF THE INVENTION

The present invention relates generally to control systems, and more particularly to software in vehicle safety-critical control systems.

BACKGROUND OF THE INVENTION

Digital processors are increasingly used in cars, trucks, aircraft and other vehicles to control safety-critical functions such as braking and engine control. One or more software variables stored in a processor memory may be considered critical to a system that controls the safety critical function. That is, if a storage location of such a variable were to become corrupted, and if the corruption were to go undetected, the processor could cause the system to take an incorrect action. If the processor is executing a safety-critical operation, protective software may be implemented to detect faults and to prompt remedial action within a critical time limit.

Current fault detection and corrective techniques are typically aimed at protecting software variables based on one or more types of failure mode from which corruption could result. Various types of system faults could occur, including but not limited to random access memory (RAM) hardware failures, calculation errors caused by writes to a wrong storage location, arithmetic logic unit (ALU) failures, RAM data storage faults, and read-only memory (ROM) faults. Tests currently in use for detecting corruption of a critical software variable, however, may be vulnerable to corruption that occurs after the test but before the variable is used.

SUMMARY OF THE INVENTION

The present invention, in one configuration, is directed to a vehicle including a system for validating a variable signal for input to a processor-performed function. The system includes a processor, a memory having at least first and second storage locations, and an input module that receives the signal. The processor tests the first and second storage locations. After the testing, the processor stores the signal in the first and second storage locations to obtain first and second stored values. The processor compares the first and second stored values and tests the first stored value for any corruption associated with receipt of the signal by said input module. The processor inputs the first and second stored values to first and second paths for performing the function to obtain two function results, and compares the results.

In another implementation, the invention is directed to a method of validating a variable input to a function performed using a processor and a memory. First and second storage locations in the memory are tested. An input signal is delivered to the tested storage locations to obtain first and second stored values. The first stored value is compared with the second stored value. The first and second stored values are input to first and second paths for performing the function to obtain two function results, and the results are compared.

In another implementation, the invention is directed to a method of validating a variable signal input to a function performed using a processor and a memory. The signal is received. First and second storage locations in the memory are tested. The received signal is delivered to the tested storage locations to obtain first and second stored values. The first stored value is tested for any corruption associated with the receiving step. The first and second stored values are input to first and second paths for performing the function to obtain two function results, and the results are compared.

In yet another implementation, the invention is directed to a system for validating a variable signal input to a function performed using a processor and a memory. An input module receives the signal. First and second storage locations of the memory are tested for a coupling fault and receive the signal from the input module as first and second stored values. The system compares the first stored value with the second stored value, inputs the first and second stored values to first and second paths for performing the function to obtain two function results, and compares the results.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF EXEMPLARY EMBODIMENTS

Figure 1:
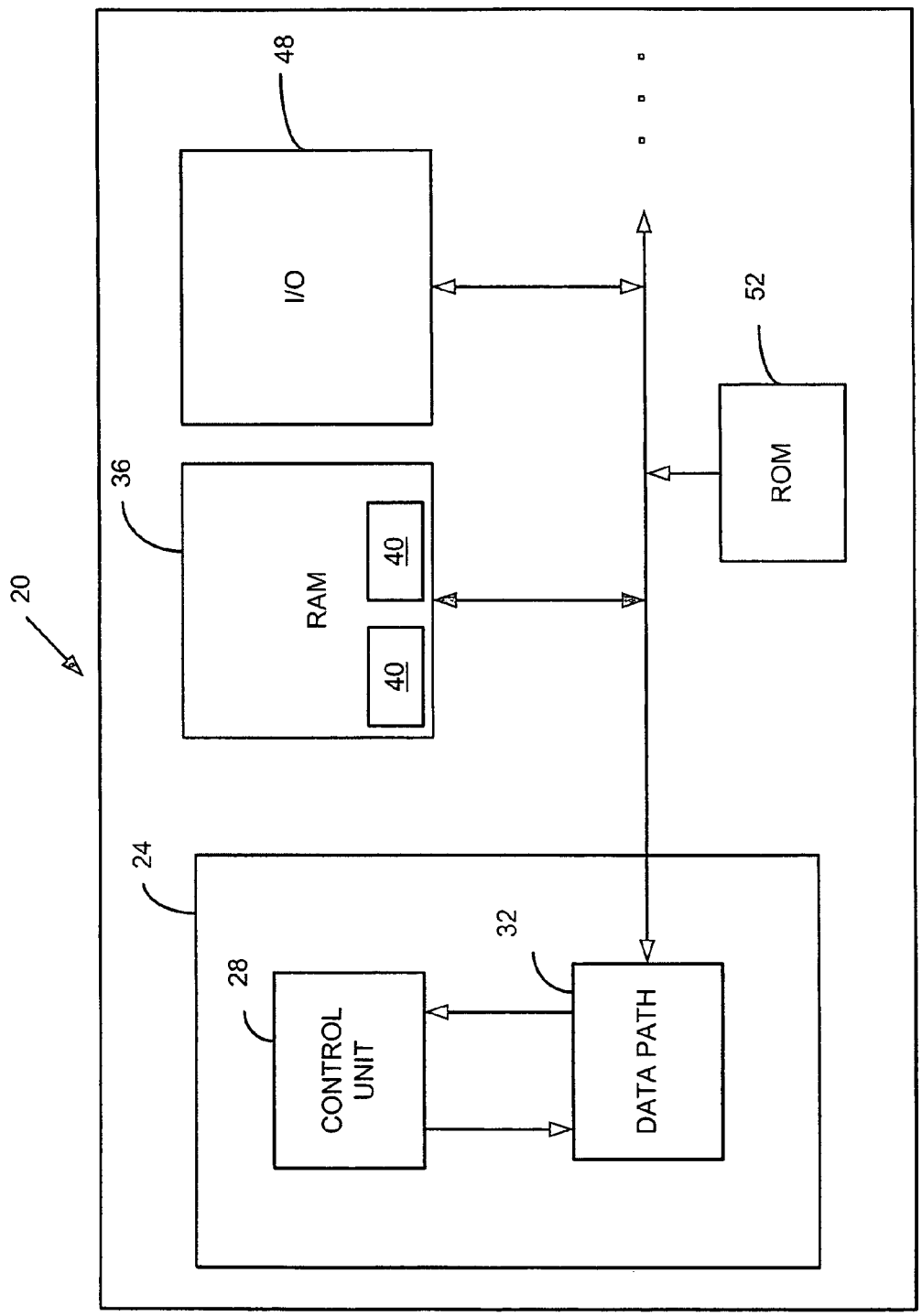
FIG. 1 is a block diagram of a vehicle in accordance with one configuration of the present invention.

The following description of various embodiments of the present invention is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, or other suitable components that provide the described functionality.

The present invention, in one configuration, is directed to a system designed to detect corruptions of critical software variables and take remedial action to maintain integrity of the system. Implementations, however, are also contemplated for use in connection with non-critical variables and systems.

A block diagram of a vehicle in accordance with one configuration of the present invention is indicated generally in FIG. 1 by reference number 20. The vehicle 20 may be, for example, a car, truck, aircraft or other vehicle in which a processor 24 controls one or more functions. Such functions may include one or more safety-critical functions, for example, braking, hazard control and/or engine control. The processor 24 includes a control unit 28 and a data path 32.

A memory 36 includes random access memory (RAM). Two storage locations 40 of the memory 36 are further discussed below. The processor 24 is in communication with the memory 36 and with one or more input and/or output (I/O) modules 48. An input/output module 48 may include hardware and/or software. Module(s) 48 may be connected with various sensing modules of the vehicle 20 and may convert analog data to digital signals for transmission to the processor 24. Module(s) 48 thus may include, for example, analog/digital (A/D) converter(s), pulse-width modulation (PWM) converter(s), dual-port memory, controller area network (CAN) bus(es), local interconnect network (LIN) bus(es), and/or device(s) using serial peripheral interface (SPI), frequency encoding, scalable coherent interface (SCI), and/or single-edge nibble transmission (SENT). The foregoing devices and methods are exemplary only; other or additional devices and/or methods could be used to input sensor data. The processor 24 may also access one or more read-only memories (ROMs) 52.

Figure 2A:
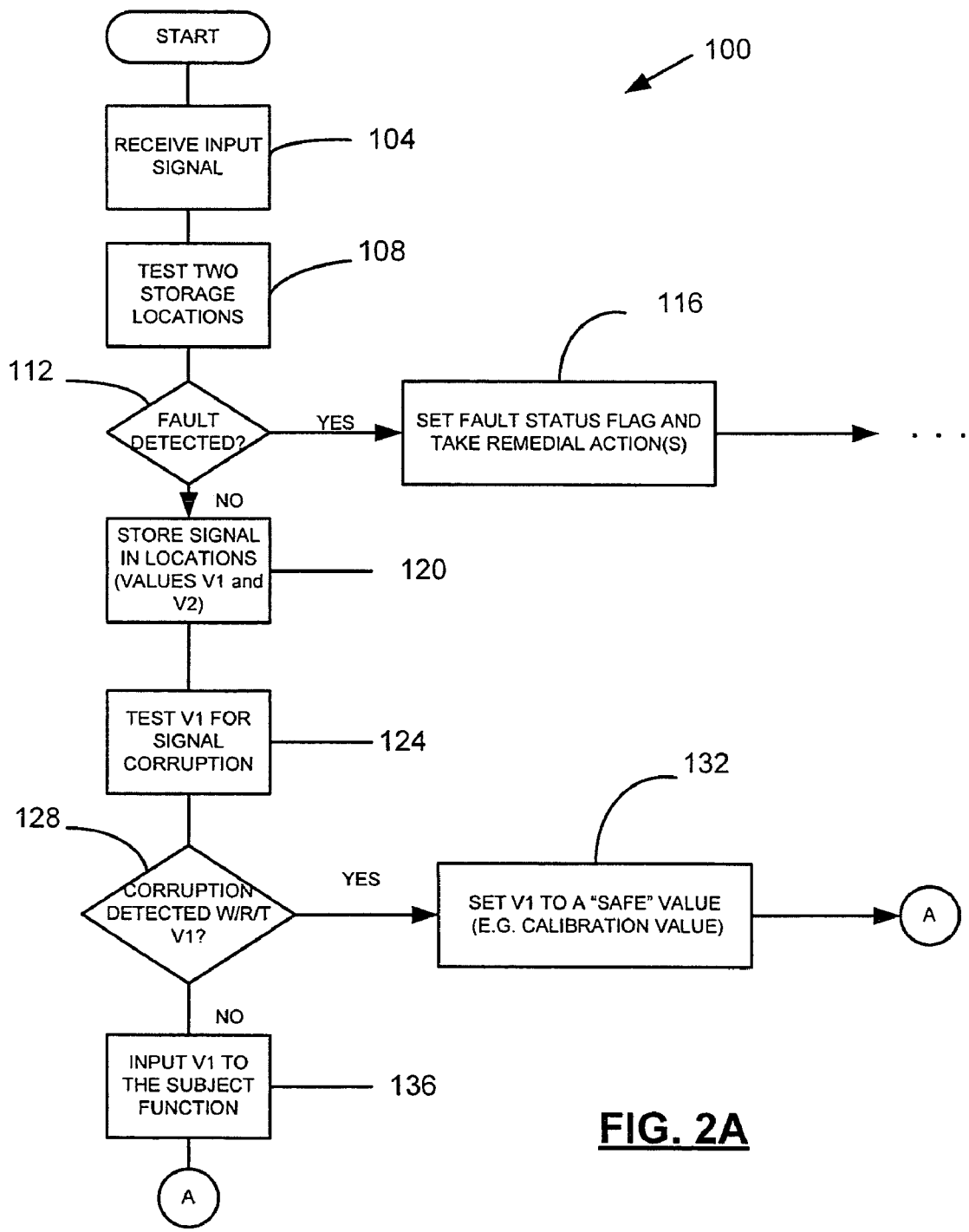
FIGS. 2A and 2B are a flow diagram of a method of validating a variable input to a function performed using a processor and memory according to one implementation.
Figure 2B:
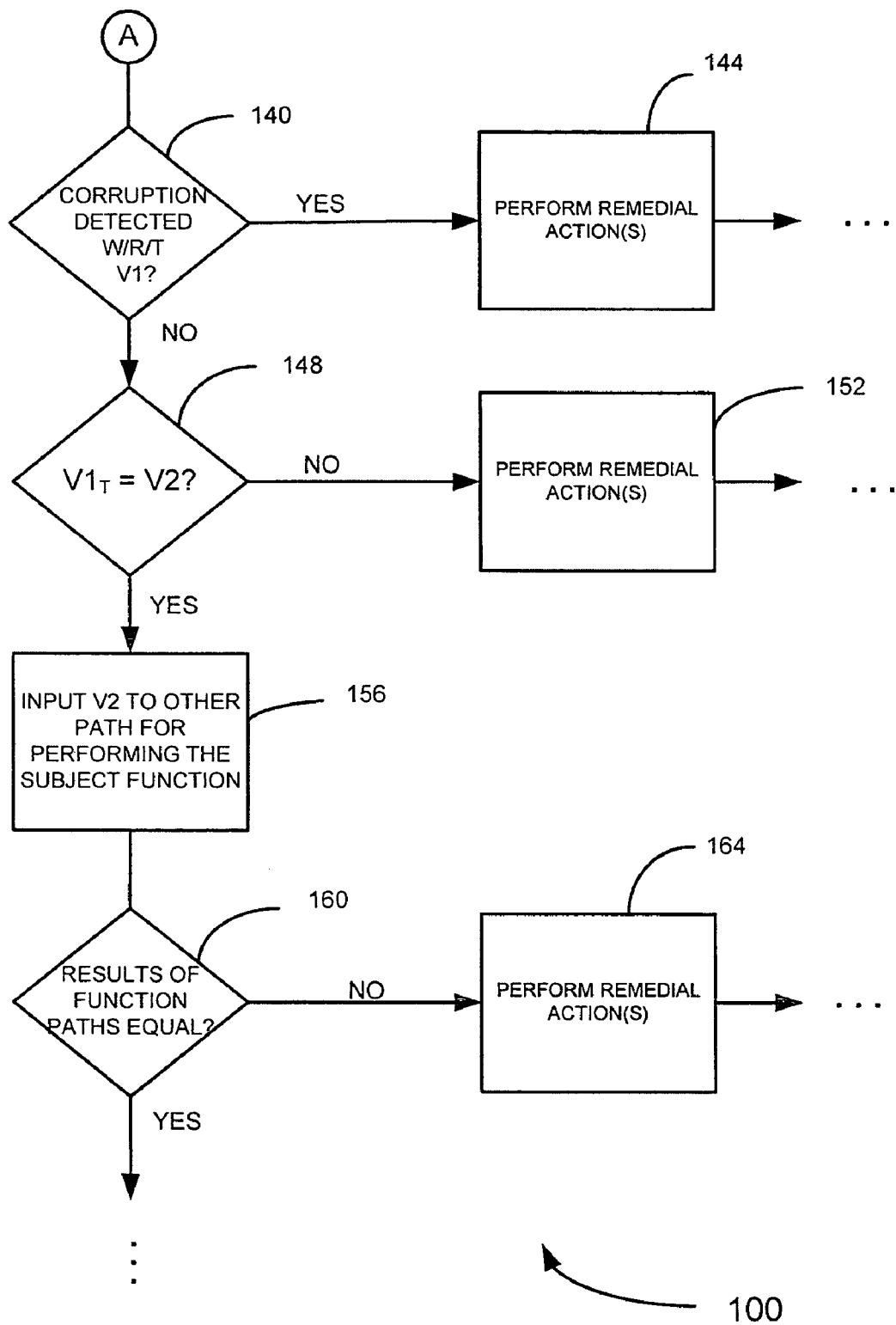
Figure 3:
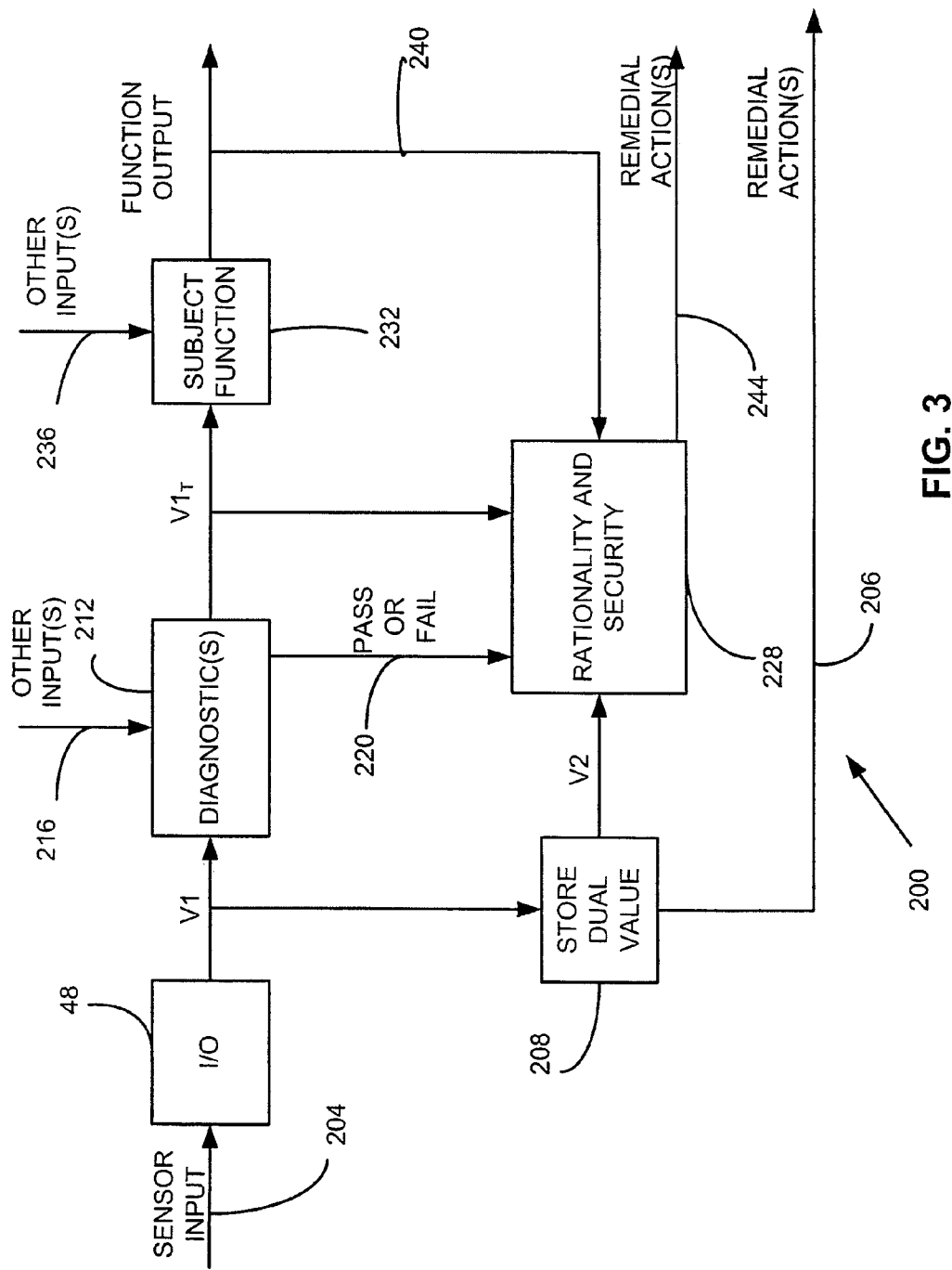
FIG. 3 is a block diagram of one configuration of a system for validating a variable signal input to a function.

One implementation of a method for validating a variable signal input to a function performed in the vehicle 20 is indicated generally in FIGS. 2A and 2B by reference number 100. The function (referred to herein as "the subject function") may be a safety-critical function implemented at least partly in software and performed using the processor 24 and memory 36. The method 100 shall be described herein with reference also to FIG. 1 and to FIG. 3, which includes a block diagram of one configuration of a system 200 for validating a variable signal input to a function such as the subject function.

In step 104, a signal 204, e.g., input from a pressure sensor or other sensor of the vehicle 20, is received in an input module 48. The input signal may be an A/D read signal, but other or additional input signals, e.g., pulse-width modulation signals and/or signals via a serial peripheral interface, also are contemplated.

In step 108, the two storage locations 40 of the memory 36 are tested for corruptions, such as coupling faults, that may affect both locations 40. For example, a known March C test may be performed on the two locations 40. March C testing optionally may be performed only as to the two locations 40. In step 112, it is determined whether the March C test detects a fault. If the answer is yes, a fault status flag is set and remedial action(s) are taken, as represented by a remedial action (s) signal 206 in step 116.

If no fault is detected in step 112, then in step 120, an input signal V1 from the input module 48 is stored in both of the two storage locations 40. More specifically, at a "Store Dual Value" block 208, the signal V1 or, alternatively, a complementary form of the signal V1, is stored in one of the two storage locations 40 to provide a dual stored value V2. The stored values V1 and V2 may be used to protect the integrity of a read value of the signal 204 used in diagnostic and control calculations as further described below.

In step 124, the stored value V1 is tested for any corruption resulting, for example, from sensor reads associated with receiving the input signal 204. Such testing, associated with a "Diagnostics" block 212 in FIG. 3, could include, for example, out of range checks and/or rate of change tests. The stored value V1 optionally could also be compared with other inputs 216, for example, in a correlation diagnostic.

In step 128, it is determined whether corruption is detected with respect to the stored value V1. If yes, then in step 132 the stored value V1 may be defaulted to a "safe" value, typically a calibration value stored in ROM 52 of the vehicle 20, and control passes to step 140. Additionally or alternatively, a fault flag may be set and/or other or additional remedial action(s) may be taken. The tested value (which may be a default value as previously discussed) is indicated as $V1_T$ in FIG. 3. A pass/fail signal 220 is delivered to a "Rationality and Security" block 228 for use as further described below.

If testing was successful in step 128, then in step 136 the stored value $T1_T$ is input to a "Subject Function" block 232, i.e., the subject function for which it is desired to provide a valid input. Other input(s) 236 may also be provided to the "Subject Function" block 232, in accordance with input requirements of the subject function. The block 232 produces an output signal 240 which is delivered to the "Rationality and Security" block 228 for use as further described below.

At the "Rationality and Security" block 228, several actions are performed to validate input to the subject function. Specifically, in step 140 the pass/fail signal 220 is tested at block 228 to determine whether corruption is detected with respect to the stored value V1. If the answer is yes, then remedial action(s), represented by a signal 244 in FIG. 3, may be taken in step 144. If corruption is not detected in step 140, the stored values $V1_T$ and V2 are compared with each other in step 148. If the values are not equal, then in step 152 remedial action(s) may be taken, as represented by the signal 244. In one configuration, if a default value from ROM 52 has been substituted for a corrupted value $V1_T$, the substituted value can be verified by a comparison with the calibration value in ROM 52.

If the stored values $V1_T$ and V2 are determined to be equal in step 148, then in step 156 the subject function is performed at the "Rationality and Security" block 228. The stored value V2 is input to the subject function, in a path dual to that of the subject function at the "Subject Function" block 232. In step 160, results of the two paths for performing the subject function are compared. Specifically, the output signal 240 is compared with a result of the subject function performed at the block 228. If the results are not equal, then in step 164 remedial action(s) may be taken, as represented by the signal 244. If in step 160 the results are determined to be equal, then it is assumed that the subject function is receiving valid input at block 232.

In another configuration, the path ("secondary path") dual to that of the subject function may represent a simplified implementation of the subject function, for example, in order to conserve computer resources. Additionally or alternatively, the subject function of the secondary path may be coded separately, for example, to allow detection of coding problems. In such configuration(s), a comparison performed at the block 228 would test function results for "closeness", e.g., for values within a calibrated error threshold.

Implementations of the foregoing system and method can be used to detect corruption of safety-critical software values, no matter where the corruption occurs in the course of receiving and using such values. Testing is performed not only before but also after a variable is used.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A vehicle comprising:
    a system for validating a variable signal for input to a processor-performed function, said system including a processor, a memory having at least first and second storage locations, and an input module that receives the signal;

wherein said processor:
tests the first and second storage locations;
after said testing, stores the signal in the first and second storage locations to obtain first and second stored values;
compares the first and second stored values;
tests the first stored value for corruption associated with receipt of the signal by said input module;
inputs the first and second stored values to first and second paths for performing the function to obtain two function results; and
compares the results.

2. The vehicle of claim 1 wherein said input module comprises at least one of the following: an analog-to-digital converter, a pulse-width modulation (PWM) converter, a controller area network (CAN) bus, a local interconnect network (LIN) bus, a device using serial peripheral interface (SPI), a device using frequency encoding, a device using scalable coherent interface (SCI), a dual-port memory, and a device using single-edge nibble transmission (SENT).

3. The vehicle of claim 1 wherein said processor performs a March-C test to test the first and second storage locations.

4. A method of validating a variable input to a function performed using a processor and a memory, said method comprising:
testing first and second storage locations in the memory;
delivering an input signal to the tested storage locations to obtain first and second stored values;
comparing the first stored value with the second stored value;
inputting the first and second stored values to first and second paths for performing the function to obtain two function results; and
comparing the results.

5. The method of claim 4 further comprising:
receiving the input signal; and
testing the first stored value for one or more faults associated with said receiving.

6. The method of claim 5 further comprising performing a remedial action based on a result of at least one of said testing and comparing steps.

7. The method of claim 6 wherein performing a remedial action comprises delivering a default input to the function.

8. The method of claim 5 wherein testing the first stored value for one or more faults comprises testing for corruption associated with a sensor read.

9. The method of claim 4 wherein testing first and second storage locations comprises performing a March-C test on the locations.

10. The method of claim 4 wherein testing first and second storage locations comprises testing for a coupling fault.

11. The method of claim 4, wherein said first and second stored values comprise complementary values.

12. A method of validating a variable signal input to a function performed using a processor and a memory, said method comprising:
receiving the signal;
testing first and second storage locations in the memory;
delivering the received signal to the tested storage locations to obtain first and second stored values;
testing the first stored value for any corruption associated with said receiving step;
inputting the first and second stored values to first and second paths for performing the function to obtain two function results; and
comparing the results.

13. The method of claim 12 further comprising comparing the first stored value with the second stored value.

14. The method of claim 13 further comprising performing a remedial action based on a result of at least one of said testing and comparing steps.

15. The method of claim 14 wherein performing a remedial action comprises delivering a default input to the function.

16. The method of claim 13 wherein testing the first stored value for any corruption comprises testing for one or more faults associated with a sensor read.

17. The method of claim 12 wherein testing first and second storage locations comprises performing a March-C test on the locations.

18. The method of claim 12 wherein testing first and second storage locations comprises testing for a coupling fault.

19. The method of claim 12, wherein said first and second stored values comprise complementary values.

20. A system for validating a variable signal input to a function performed using a processor and a memory, said system comprising:
a processor;
memory;
an input module that receives the signal; and
first and second storage locations of the memory which are tested for a coupling fault and which receive the signal from the input module as first and second stored values;
wherein said system:
compares the first stored value with the second stored value;
inputs the first and second stored values to first and second paths for performing the function to obtain two function results; and
compares the results.

21. The system of claim 20 wherein said memory comprises a random access memory.

22. The system of claim 20 wherein said first and second storage locations of the memory receive the signal from the input module after being tested.

23. The system of claim 20 wherein said input module comprises at least one of the following: an analog-to-digital converter, a pulse-width modulation (PWM) converter, a controller area network (CAN) bus, a local interconnect network (LIN) bus, a device using serial peripheral interface (SPI), a device using frequency encoding, a device using scalable coherent interface (SCI), a dual-port memory, and a device using single-edge nibble transmission (SENT).

* * * * *